March 30, 1937. J. A. NOWINSKI 2,075,050
ARTICLE HANDLING MECHANISM
Filed Jan. 4, 1934
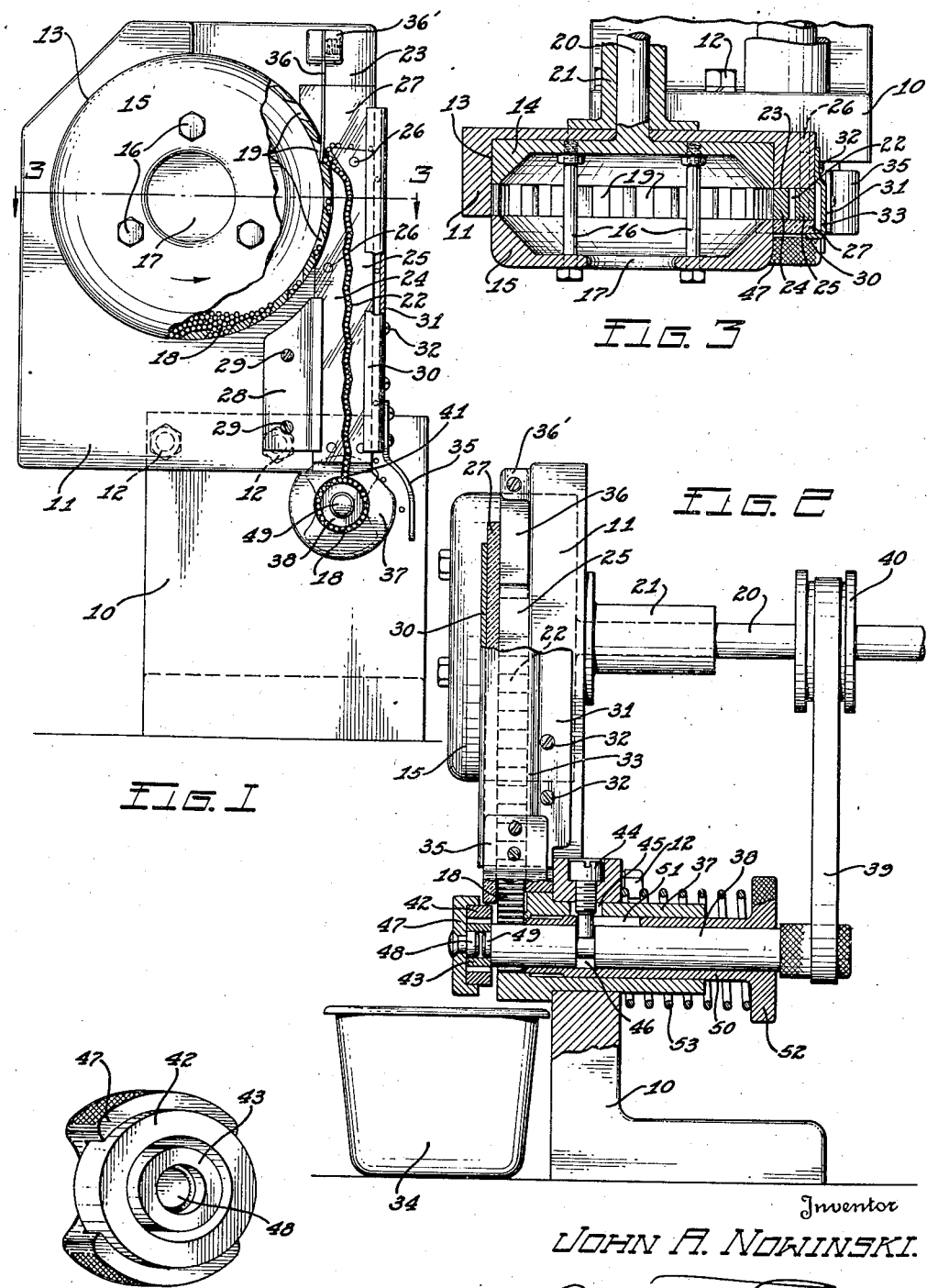
Inventor
JOHN A. NOWINSKI.

Patented Mar. 30, 1937

2,075,050

UNITED STATES PATENT OFFICE 2,075,050

ARTICLE HANDLING MECHANISM

John A. Nowinski, Detroit, Mich., assignor to Packard Motor Car Company, Detroit, Mich., a corporation of Michigan Application January 4, 1934, Serial No. 705,221

3 Claims. (Cl. 221—135)

This invention relates to feeding machines and more particularly to machines for assembling roller bearings with their race members.

An object of the invention is to provide a new and novel machine which is operable to quickly and accurately assemble roller bearing sets between their race members.

Another object of the invention is to provide a machine for automatically feeding bearings into a position such that they can be readily moved bodily in complete sets between their race members.

A further object of the invention is to provide mechanism which is manually operable to quickly transfer complete sets of roller bearings from a temporary holder to their assembled position between race members.

Still another object of the invention is to provide a bearing assembly device by means of which roller bearings are moved from a common source of supply into sets in a temporary holder from which they can be transferred bodily into assembled relation with their race members.

Other objects of the invention will appear from the following description taken in connection with the drawing, which forms a part of this specification, and in which:

Fig. 1 is a front elevational view, partly broken away and partly in section, of a bearing assembling machine incorporating my invention;

Fig. 2 is a side elevational view of the same, partly broken away and partly in section;

Fig. 3 is a sectional view taken on line 3—3 of Fig. 1;

Fig. 4 is a perspective view of a collet and a set of race members for receiving a set of roller bearings detached from the machine.

Referring now to the drawing by characters of reference, the supporting structure for the machine is shown as being comprised of a base 10 and a standard 11 secured together by bolts 12. On the base is mounted mechanism which forms a temporary raceway for receiving sets of rollers and means for bodily displacing the sets of rollers from the temporary raceway. On the standard is mounted a rotatable hopper drum and means for feeding roller bearings singly to the temporary raceway.

The standard is in the form of a plate having a circular recess 13 in which the hopper drum is rotatably mounted. This drum preferably consists of two sections 14 and 15 which are secured together by bolts 16. The exposed end of the drum section 15 is formed with a central opening 17 through which roller bearings, as indicated at 18, can be inserted to maintain a substantial supply and the peripheral wall of the drum has spaced parallel slots 19 extending therethrough. These slots are formed at an angle for purposes hereinafter to be described. Fixed to the drum is a drive shaft 20 which is supported by a bearing 21 suitably fixed to the standard, the shaft being driven from a suitable source of motor power. The recess 13 is of sufficient depth so that it covers the slots 19 except for a portion hereinafter referred to.

The drum serves as a roller reservoir and provides elevating means for delivering the rollers to the mouth of a tortuous passage 22 through which they travel by gravity. One face of the standard 11 is cut-away, along an edge to form a recess 23 for receiving a pair of vertically extending plates 24 and 25, the outer surface of such plates being flush with the main front surface of the standard. These plates are secured in position by pins 26 and they have spaced apart staggered adjacent surfaces forming the tortuous passage 22 therebetween. The mouth of such passage extends toward the periphery of the drum so that it is in open communication and registers with the slots 19 in the drum as they pass thereby. The plate 24 has one edge cut away so that a portion thereof extends complementary to the peripheral wall of the drum and serves to close the slots and thereby assist in the elevation of the rollers in the slots to the point where they register with the mouth of the passage 22.

A suitable cover means is secured over the plates in order to close the front of the passage 22. In the present instance, this cover means consists of a glass panel 27 which is cut away similarly to the plate 24 in a complementary relation to the drum. A suitable guide and retaining means is provided for the cover member and consists of a flanged clip member 28 secured to the front face of the standard by screws 29 and a flange 30 of a sheet metal chute forming member 31. In the present instance, this sheet metal member 31 is secured to the side of the standard by screws 32 and is formed with a bent-out portion 33 which is spaced from the outer end of the plate 25 to form therebetween a guideway or chute through which rollers in excess of the amount which can be accommodated by the passage 22 can be carried away. This chute member extends a short distance above the top of the plate 25 so that rollers overflowing from the mouth of the passage 22 will move across the top of the plate 25 and into the overflow guideway through which they will fall by gravity. To the lower end of the guideway member 31 is fixed an extension 35 to further direct the rollers into a receptacle 34 positioned adjacent the base 10.

With the drum and the housing is associated means for clearing the slots of the rollers when in registration with the inlet end of the passage 22. This means consists in this instance of a leaf spring 36 which is secured at one end to a boss 36' projecting from the forward face of the supporting standard. The spring extends downwardly and is of such length and flexibility that it will project into the slots 19 to engage the inner face of the bottom wall surface of the slots and slide outwardly thereon, as the drum rotates, to move the rollers outwardly of the slots and into the mouth of the passage 22. The angle at which these slots are formed provides a surface which holds the rollers in the slot and allows them to move by gravity into the mouth of the passage 22 when they register therewith. The resiliency of the member 36 will permit it to engage the walls forming the slots and spring outwardly as the drum continues in its upward rotation relative thereto.

Carried by the base 10 and associated with the gravity feed passage 22 is mechanism providing a temporary raceway, a pilot for race members to be filled with roller sets and means for transferring sets of rollers from the temporary raceway to their assembled position between the race members. The base is formed with an opening into which is pressed a sleeve 37 so that it is fixed. Extending concentrically through the sleeve and in spaced relation therewith is a shaft 38 which is driven at its end by a belt 39 which extends around a pulley 40 fixed to and driven by the shaft 20. One end of the sleeve 37 lies beneath the passage 22 and is formed with a slot 41 which forms a continuation of the passage and allows rollers therein to move by gravity into the temporary raceway formed between this end of the sleeve and the portion of the shaft 38, which extends therethrough. This temporary raceway is similar to the raceway between a pair of race members 42 and 43 into which the set of roller bearings are ultimately assembled. In order to prevent axial movement of the shaft 38 a set screw 44 is provided, such retaining element being screwed through the top portion of the base, a slot 45 in the sleeve 37 and into an annular recess 46 formed in the shaft 38.

A collet 47 is utilized to hold the pair of race members 42 and 43, there being a pilot 48 attached to the center of the collet to be partially telescoped by the race member 43. The race members have a sliding fit with the collet and the pilot 48 positions the inner race member in desired spaced relation with the outer race member to receive a set of roller bearings therebetween. On the end of the shaft 38 is a pilot 49 for the inner member of the bearing races which aligns with the pilot 48 of the collet. The flange of the collet is recessed so that the outer race member can be readily grasped and retained or displaced by the operator.

When the collet contains the pair of ring race members and the inner race member is piloted by the shaft extension 49, the set of bearings in the temporary raceway can be moved bodily endwise into assembled position between the race members by a transfer sleeve 50 which extends between the shaft and the sleeve 37. This transfer sleeve is provided with an axially extending slot 51 in order to permit axial movement past the retaining screw 44, such arrangement preventing rotational movement of the sleeve. The transfer sleeve projects beyond one end of the sleeve 37 and is formed with a narrow flange 52 which an operator can grasp to move the transfer sleeve axially in order to bodily transfer a set of bearings from the temporary raceway into the raceway between the set of race members carried by the collet. A spring 53 bears at one end against the base and at the other end against the flange 52 and will normally maintain the transfer sleeve in an axial position so that its transfer end is clear of the temporary raceway.

A quantity of roller bearings are placed in the hopper drum through the opening 17 and rotation of the drum will elevate the rollers in the slotted periphery to a point where they will fall by gravity and be cleared by the member 36 into the mouth of the passage. The roller bearings will move singly by gravity downwardly through the passage 22 and the overflow will pass across the top of the plate 25 and fall by gravity through the chute formed by the bent-out portion 33 of the strip 31. The rollers pass from the outlet end of the passage 22 into the slot 41 in the sleeve 37 and move into the temporary raceway between one end of the sleeve 37 and the shaft 38 until the raceway is filled. The shaft 38 is rotated in order to assist the rollers in assuming a close relationship in the temporary raceway so that a complete set will be quickly and properly distributed. When the temporary raceway is filled with a set of roller bearings, the operator grasps the collet 47 in which he has assembled a pair of ring race members and places the inner race member over the pilot 49 of the shaft 38 whereupon he moves the transfer sleeve 50 axially and forces the set of rollers in the temporary raceway into the aligned permanent raceway between the race members in the collet. The collet and race members held thereby are then moved away from the shaft 38 and the bearing structure is in a relation to be applied as an assembled unit into position with the device with which it is to be permanently associated. Through means of the structure herein described, I am able to quickly and accurately assemble sets of roller bearings with race members.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a bearing assembling machine, a supporting member, a pair of vertically extending plates secured in spaced relation to one side of the supporting member and forming a passage between adjacent walls thereof through which roller bearings are adapted to move singly by gravity, a cover fixed over the plates to enclose the passage, and another cover associated in spaced relation with an end of one of said plates and extending above the top thereof to form a guideway for roller bearings overflowing the mouth of the passage.

2. In a roller bearing handling machine, the combination with a rotatable hopper drum having a slotted peripheral wall, and a housing having a passage therein open at its upper end to receive rollers directly from the slots in the drum as they pass thereby, of a roller clearing means comprising a leaf spring positioned to enter the slots in said drum behind the rollers being elevated therein as they approach the inlet end of said passage, said drum in its rotation moving the spring outwardly of the slots to thereby sweep the rollers from the slots into the passage.

3. In a roller bearing handling machine, the combination of a standard, a rotatable hopper drum having a slotted peripheral drum, a housing having a passage with an inlet at its upper end to receive rollers directly from the slots in the drum as they pass thereby, and resilient means fixed at its upper end to the standard and arranged to project into the slots in the drum behind the rollers being elevated as they move upwardly, the drum in its rotation engaging said resilient element to move it outwardly from the slots to thereby sweep the rollers into the inlet end of the passage.

JOHN A. NOWINSKI.